United States Patent [19]
Brown

[11] 3,774,189
[45] Nov. 20, 1973

[54] HEATER CABLE ALARM SYSTEM

[75] Inventor: David O. Brown, Tulsa, Okla.

[73] Assignee: Sola Basic Industries, Inc., Milwaukee, Wis.

[22] Filed: Sept. 29, 1972

[21] Appl. No.: 293,346

[52] U.S. Cl. ......... 340/253 B, 340/253 C, 340/256, 340/417, 219/510
[51] Int. Cl. ............................................. G08b 21/00
[58] Field of Search ..................... 340/253 C, 253 B, 340/256, 417; 219/510

[56] References Cited
UNITED STATES PATENTS
| | | | |
|---|---|---|---|
| 2,355,222 | 8/1944 | Large | 340/417 |
| 3,585,623 | 6/1971 | Laukaitis | 340/256 |
| 3,601,689 | 8/1971 | Kettler | 340/417 |

*Primary Examiner*—Thomas B. Habecker
*Attorney*—D. Verner Smythe et al.

[57] ABSTRACT

In a heater failure alarm system, a current sensor senses the current flow in the heater cable and generates a failure warning signal if there is not current flow when the heater cable is switched on. The current sensing transformer is adapted to be juxtaposed relative to the heater cable and is connected to a self-contained circuit module which closes relay contacts when current flow is not sensed. An alarm switch is mechanically connected to a main power switch for the heater cable and is in series with the relay contacts and an alarm means.

7 Claims, 4 Drawing Figures

HEATER CABLE ALARM SYSTEM

This invention relates to an equipment and power failure alarm and especially to a heating system failure alarm wherein the failure alarm cooperates with the function of the heating system.

Cable heating systems have been an extremely successful means of remotely heating pipe lines, conduits, large vessel container, etc., where conventional heating systems have failed or proved to be too expensive. A thermostat with a remote temperature sensor controls the electrical power applied to the electric heating cable to maintain a uniform temperature at the remote location and the thermostat may be readjusted to attain a temperature desired. Heretofore, it has been difficult to determine whether there has been a failure of the heating system and supply of electrical power. Electrical power can be monitored by having a watchman observe an indicator, with the indicator being extinguished in the case of power failure. A failure of the heating system could only be determined if there were a remote temperature indicator which would need constant observation by a watchman.

One of the objects of the invention is to overcome a serious fault of the heretofore known cable heating systems.

Another of the objects of the invention is to provide a failure warning system of comparatively low cost and of efficient electrical design.

Still another of the objects of the invention is to provide a failure warning system that is automatic and does not need constant observation.

Yet another object of the invention is to provide a failure warning system that will not yield a fallacious warning when electrical power is intentionally switched off by a thermostat.

According to one aspect of the present invention, a current sensing circuit senses alternating current flow in a heater circuit by a current transformer, rectifies the alternating current, limits the amplitude and integrates the rectified current and applies it to a relay solenoid coil. An auxilliary switch is mechanically connected to a main power switch for the heater cable which may be controlled by a thermostat. The auxilliary switch is electrically connected in series with the relay contacts of the heater failure alarm module, so that when the heater cable is switched on by the main power switch and no current flow is sensed, the alarm is energized to generate a warning signal.

Other objects, advantages and features of the present invention will become apparent from the following description and drawings, which are merely exemplary.

In the drawings.

Where appropriate, the same reference numerals will be used to indicate the same parts in the various figures.

Figure 1:
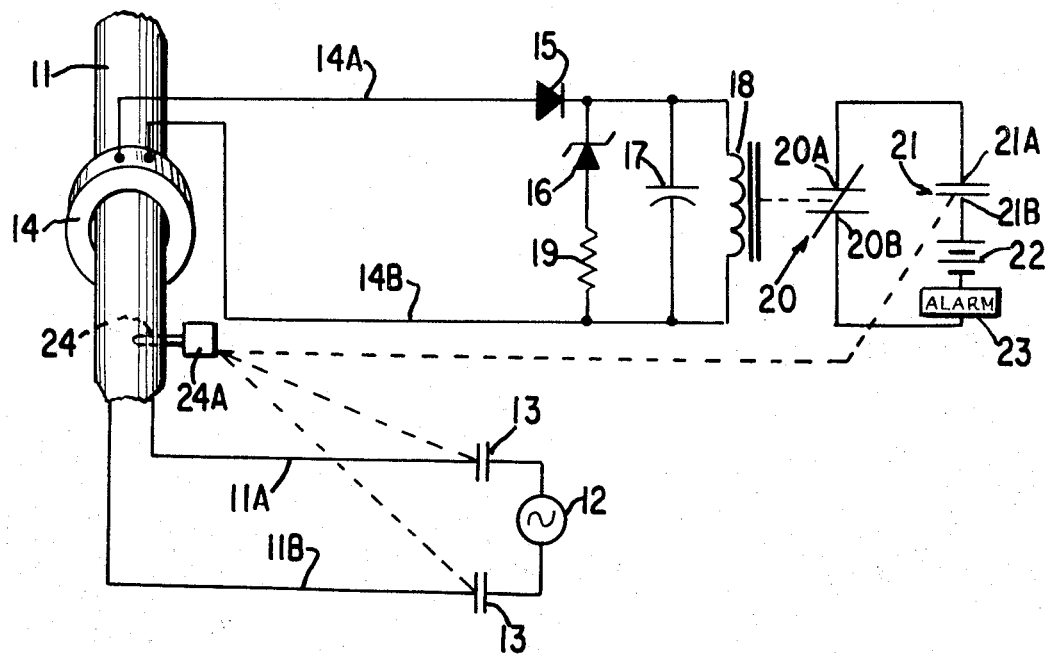
FIG. 1 is an electrical schematic diagram of the heater failure alarm system of one embodiment.

Referring to FIG. 1, heater cable 11 having leads 11A and 11B is connected to a source of alternating current power 12 through contacts of power switch 13. A toroidal current transformer 14 is juxtaposed relative to heater cable 11 and one lead 14A of transformer 14 is connected to one lead of rectifying diode 15. The other lead of diode 15 is connected to one lead of a zener diode 16, capacitor 17 and relay solenoid coil 18. The other lead 14B of transformer 14 is connected to one lead of resistor 19 and to the other leads of capacitor 17 and relay solenoid coil 18. The other lead of zener diode 16 is connected to the other lead of the resistor 19.

One terminal 20A of normally closed relay contacts or solenoid-operated switch 20 is connected to one terminal 21A of thermostatically operated switch 21 and the other terminal 21B of the switch 21 is connected to a terminal of battery 22 or source of power. A terminal of the battery 22 is connected to one terminal of an alarm 23 and the other terminal of alarm 23 is connected to terminal 20B of solenoid-operated relay switch 20. A thermostat 24 is juxtaposed relative to heater cable 12 and is mechanically connected by conventional solenoid-operated means 24A to switches 13 and 21 to operate them, such mechanical connection being schematically shown by dotted lines 24B. The alarm may be any suitable device, such as a light or sound or visual indicator.

In operation, thermostat 24 senses the need for heat and closes power switches 13 and auxiliary switch 21, causing alternating current flow through the heater cable 12. Auxiliary switch 21 may be part of the thermostat control 24 and 24A. The transformer 14 senses the alternating current flow and generates an alternating current signal proportional to the current flow sensed. Diode 15 rectifies the proportional alternating current signal and the zener diode 16, in series with the resistor 19, limits the maximum amplitude of the rectified signal. The capacitor 17 integrates the amplitude limited signal and the integrated signal energizes the relay solenoid coil 18. Energization of coil 18 causes relay contacts 20 to open. With the switch 21 closed and contacts 20 open, no current can flow from the battery or power source 22 to alarm 23. However, if the thermostat 24 closes the switch 13 and no current flows, due to a fault with the supply of electrical power 12, a defective switch 13 or a defective heater cable 11, the relay solenoid coil 18 will not be energized and the contacts 20 will remain closed. There is a complete circuit and the alarm 23 will be energized to generate a warning signal.

Figure 2:
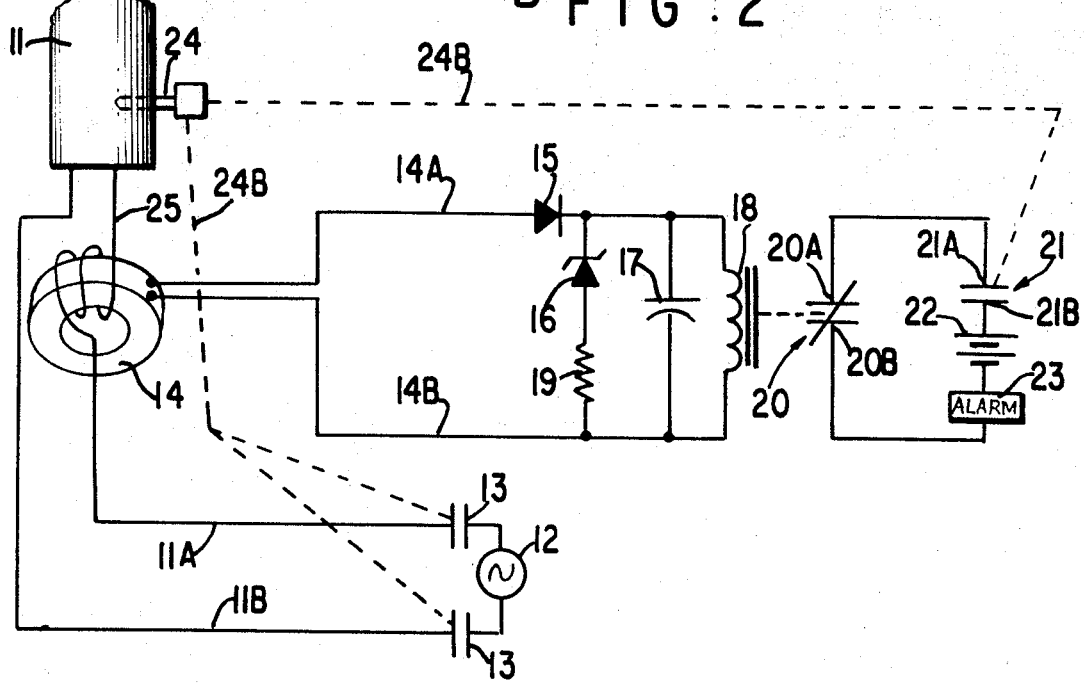
FIG. 2 is an electrical schematic diagram of the alarm system of another embodiment.

Referring to FIG. 2, a toroidal current transformer 14 has a lead 25 of the heater cable 12 wrapped around it. One lead of transformer 14 is connected to one lead of rectifying diode 15. The other lead of diode 15 is connected to one lead of a zener diode 16, a capacitor 17 and a relay solenoid coil 18. The other lead of transformer 14 is connected to one lead of resistor 19 and the other leads of the capacitor 17 and the coil 18. The other lead of the diode 16 is connected to the other lead of the resistor 19.

With reference to FIG. 2, the amplitude of the signal induced into the transformer 14 may be varied by wrapping several turns of the lead 25 from the heater cable 11 around the transformer 14. Thus, the current sensitivity may be changed so as to be proportional to the number of turns wrapped around the coil. In this manner, the same current sensing system may be used for heater cables of widely varying current requirements.

Figures 3, 4:
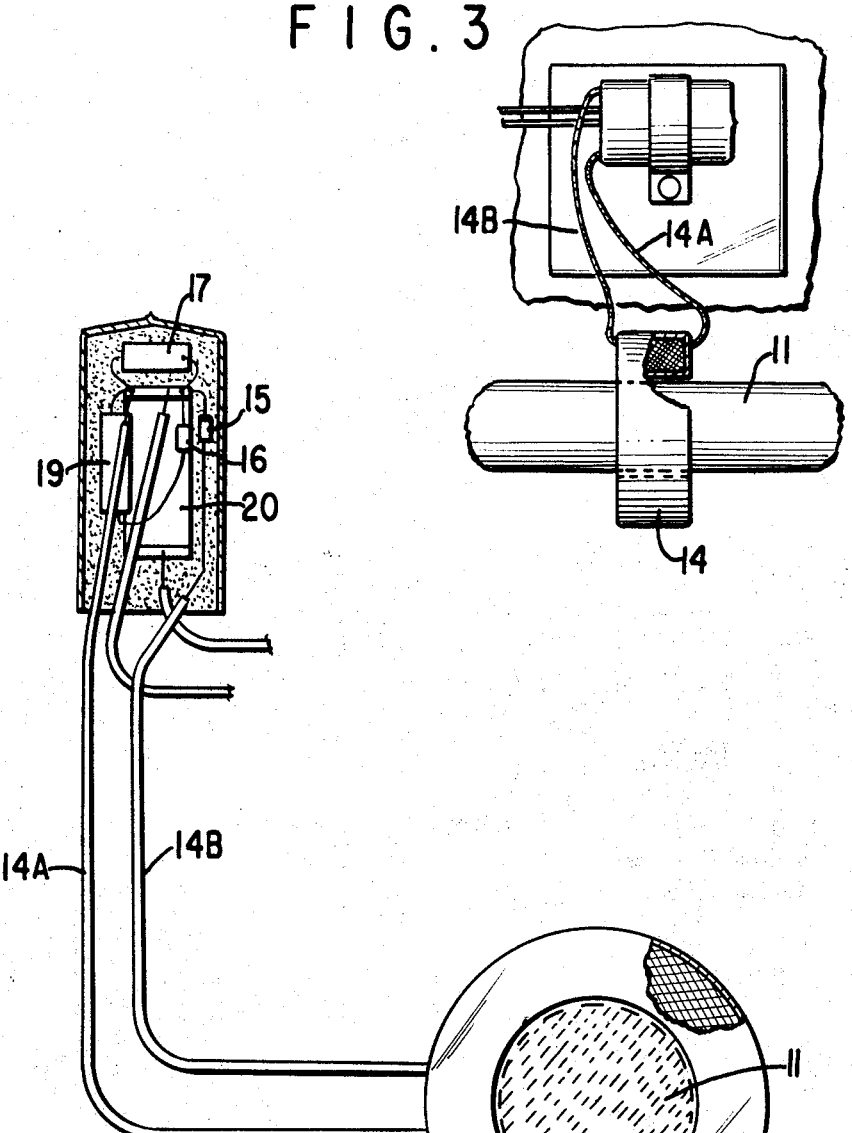
FIG. 3 is a schematic showing of one form of assembly.
FIG. 4 is an enlarged section of FIG. 3 with the elements turned relative to each other.

The alarm and sensing structure can be compactly assembled as may be seen in FIGS. 3 and 4. Also, there may be a plurality of alarm units stretched along the cable or pipe.

It will be understood that various details of construction and arrangement of parts may be made without departing from the spirit of the invention except as defined in the appended claims.

What is claimed is:

1. In a failure alarm apparatus for an electrical device, the combination including current sensing means for generating an electrical signal proportional to the current sensed, rectifying means for rectifying said current proportional electrical signal, voltage limiting means for limiting the maximum amplitude of said rectified current proportional signal, capacitor means for integrating said limited, rectified current proportional signal, relay means for operating a set of electrical contacts when energized by said integrated, limited and rectified current proportional signal, and alarm means for producing a warning signal, wherein said alarm means is connected to the electrical contacts of said relay so that a warning signal is produced when a change in current flow is sensed by said current sensing means.

2. In a failure warning apparatus as claimed in claim 1 wherein said voltage limiting means comprises a zener diode in series with a resistor.

3. In a failure warning apparatus as claimed in claim 1 wherein the warning signal is produced when the current flow sensed is below a predetermined level.

4. In an electrical apparatus, the combination including a supply of electrical power, electrical equipment, a first switch interconnecting said electrical equipment and said supply of electrical power, current sensing means for sensing the flow of current to said electrical equipment, a second switch operated by said current sensing means, a third switch mechanically connected to said first switch wherein said second and third switches are connected in series, and alarm means for producing a warning signal, operated by said second and third serially connected switches, wherein when said first switch is interconnecting said electrical equipment and said supply of electrical power and said current sensing means does not sense the flow of current, said second and third switches operate said alarm means to generate a warning signal.

5. An apparatus as claimed in claim 3 wherein said current sensing means comprises a current transformer means for inductively sensing the flow of current in an electrical circuit and producing an electrical signal proportional to the current sensed, rectifying means for rectifying said current proportional electrical signal, voltage limiting means for limiting the maximum amplitude of said rectified current proportional signal, capacitor means for integrating said limited, rectified current proportional signal, and solenoid means for operating said second switch when energized by said integrated, limited and rectified current proportional signal.

6. The apparatus of claim 5 including a thermostat mechanically connected to said first and third switches, wherein said electrical equipment is an electrical heater and said thermostat senses the temperature of the electrical heater and operates the first switch to maintain a relatively constant temperature.

7. In a heater failure alarm for a heater cable energized by alternating current, the combination including a current transformer adapted to be juxtaposed relative to a heater cable for inductively sensing the flow of current in the heater cable and producing an alternating current proportioned electrical signal which is proportional to the current sensed, a diode rectifier for converting said alternating current porportional electrical signal to a direct current signal, zener diode means for limiting the maximum amplitude of said direct current signal, a capacitor for integrating said limited direct current signal, alarm means for producing a warning signal when switched on, a relay for switching said alarm means when energized by said limited direct current signal to prevent said alarm from producing a signal.

* * * * *